United States Patent

Forster et al.

[11] Patent Number: 6,065,795
[45] Date of Patent: May 23, 2000

[54] SEATING ARRANGEMENT FOR A MOTOR VEHICLE

[75] Inventors: Roland E. Forster, Rochester Hills; Kenneth S. Mack, Metamora; Thomas C. Slanec, Grosse Pointe Woods; James E. Reece, Jr., Troy; Ernest J. Barry, Clarkston, all of Mich.

[73] Assignee: DaimlerChrysler Corporation, Auburn Hills, Mich.

[21] Appl. No.: 09/145,746

[22] Filed: Sep. 2, 1998

Related U.S. Application Data

[60] Provisional application No. 60/070,359, Jan. 2, 1998.

[51] Int. Cl.⁷ ........................................................ B60N 2/00
[52] U.S. Cl. .............................................. 296/63; 296/64
[58] Field of Search ........................... 296/63, 64, 69.03, 296/66

[56] References Cited

U.S. PATENT DOCUMENTS

| | | | |
|---|---|---|---|
| 3,632,157 | 1/1972 | Lohr | 296/63 X |
| 4,216,839 | 8/1980 | Gould et al. | 296/64 X |
| 4,657,297 | 4/1987 | Ishibashi | 296/63 |
| 4,756,569 | 7/1988 | Trutter et al. | 296/63 |
| 5,201,547 | 4/1993 | Ogawa et al. | 296/195 X |
| 5,529,376 | 6/1996 | Jovan et al. | 297/257 |
| 5,570,931 | 11/1996 | Kargilis et al. | 297/378.12 |
| 5,671,964 | 9/1997 | DeRees et al. | 296/65.1 |

FOREIGN PATENT DOCUMENTS 63-46933  2/1988  Japan ......................................... 296/63

*Primary Examiner*—D. Glenn Dayoan
*Assistant Examiner*—Lori L. Coletta
*Attorney, Agent, or Firm*—Mark P. Calcaterra

[57] ABSTRACT

A seating arrangement for a motor vehicle includes a lower seat cushion for supporting a vehicle occupant. The seating arrangement further includes a floor pan. The floor pan is preferably contoured to cooperate with the lower seat cushion. More particularly, the floor pan includes a lower portion and a raised portion. The raised portion includes an upper surface which is concavely curved in each of a lateral and longitudinal direction. The lower seat cushion is attached directly to the floor pan.

5 Claims, 3 Drawing Sheets

ID=6,065,795

SEATING ARRANGEMENT FOR A MOTOR VEHICLE

CROSS-REFERENCE TO RELATED APPLICATION

This application is based on provisional patent application which has been assigned U.S. Ser. No. 60/070,359 (filed Jan. 2, 1998).

BACKGROUND OF THE INVENTION

1. Technical Field

The present invention generally relates to motor vehicles. More particularly, the present invention relates to a seating arrangement for a motor vehicle in which a seat cushion is directly attached to a contoured floor pan.

2. Discussion

Heretofore, various seat mounting and suspension systems have been used for motor vehicles. One known technique for mounting a vehicle seat is shown and described and commonly signed U.S. Pat. No. 5,671,964 entitled "Vehicle Seat Mounting Mechanism". U.S. Pat. No. 5,671,964 is incorporated by reference as if fully set forth herein.

In a conventional manner, typical motor vehicles include a generally planar floor pan secured to the chassis. The vehicle seats are in turn secured to the floor pan through various types of support structures. Most front seat units for motor vehicles are attached to the vehicle floor through an arrangement which permits fore and aft movement of the seat. Rear seating arrangements are typically intended to be stationary structures.

While known arrangements for mounting a vehicle seat to the floor of the vehicle have proven to be commercially for their intended applications, they are all associated with limitations. For example, known mounting arrangements include multiple parts requiring significant labor for assembly.

Thus, it is desirable to provide an improved seating arrangement for a motor vehicle in which the seat cushion is directly attached to a contoured floor pan, thereby eliminating conventional support structure.

SUMMARY OF THE INVENTION

It is a general object of the present invention to provide a seating arrangement for a motor vehicle having a reduced number of parts, thereby decreasing materials expenses and assembly time.

It is a related object of the present invention to provide a seating arrangement for a motor vehicle which eliminates various conventional framing components and springs.

It is a more particular object of the present invention to provide a seating arrangement for a motor vehicle in which a seat cushion is directly attached to a contoured floor pan.

In one form, the present invention provides a seating arrangement for a motor vehicle. The seating arrangement includes a lower seat cushion for supporting a vehicle occupant. The seating arrangement further includes a floor pan. The floor pan is preferably contoured to cooperate with the lower seat cushion. More particularly, the floor pan includes a lower portion and a raised portion. The raised portion includes an upper surface which is concavely curved in each of a lateral and longitudinal direction. The lower seat cushion is attached directly to the floor pan.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
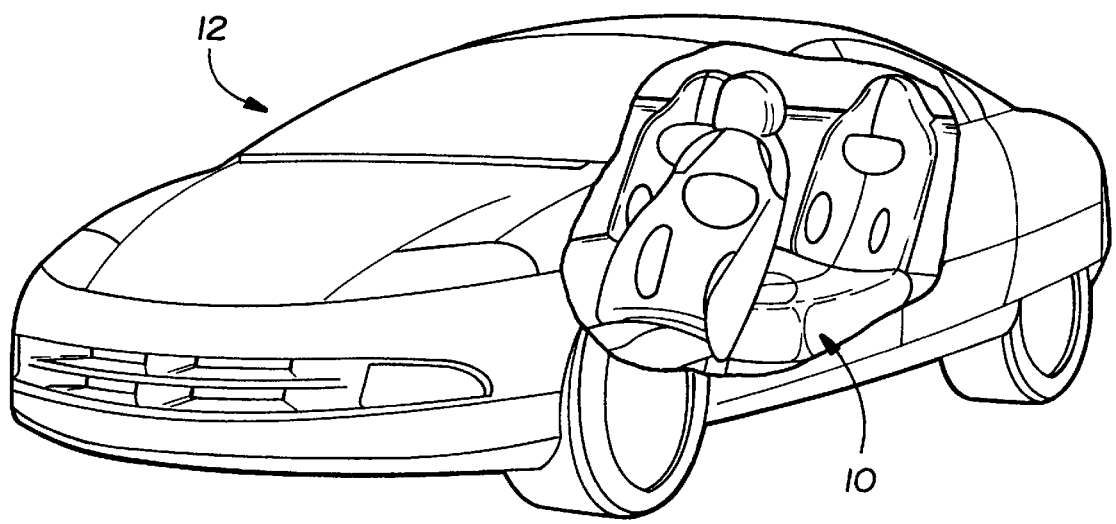
FIG. 1 is a perspective view of an exemplary motor vehicle illustrated to include an exemplary seating arrangement constructed in accordance with the teachings of a preferred embodiment of the present invention.
Figure 2:
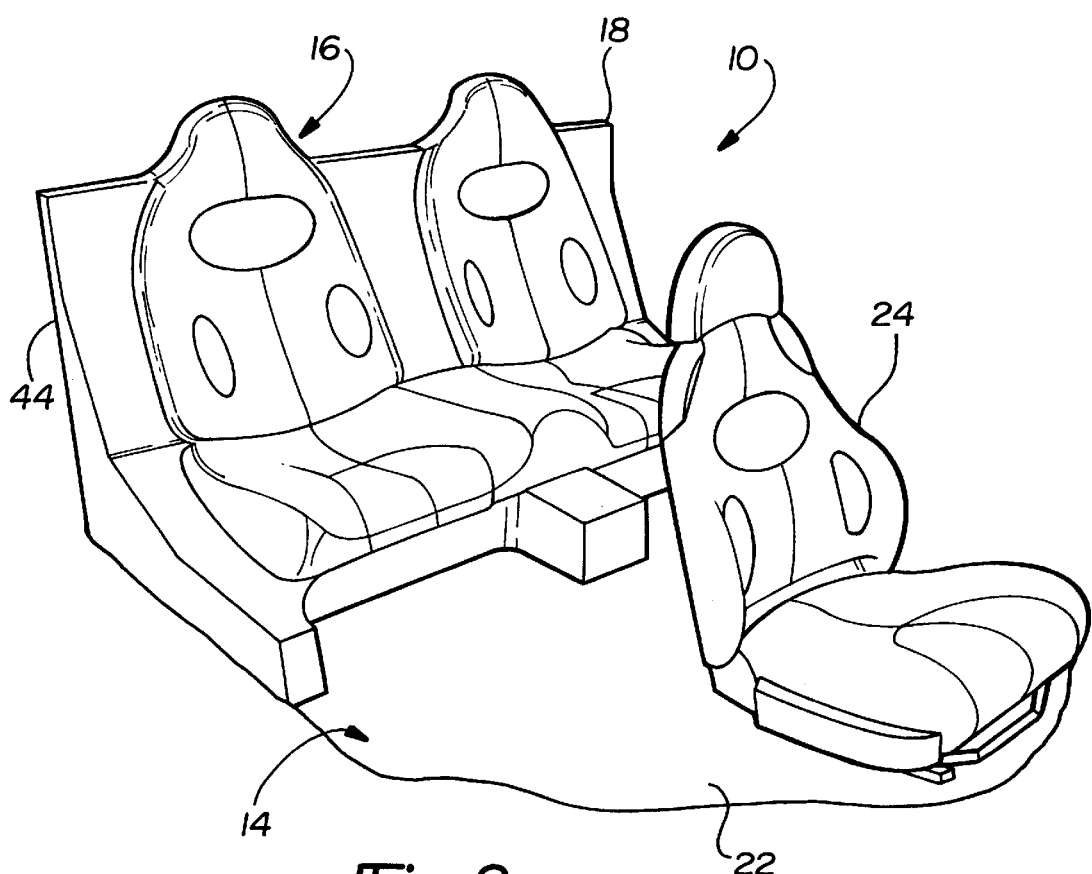
FIG. 2 is a perspective view of the seating arrangement of FIG. 1 removed from the exemplary vehicle and having one of the front bucket seats removed for purposes of illustration.
Figure 3:
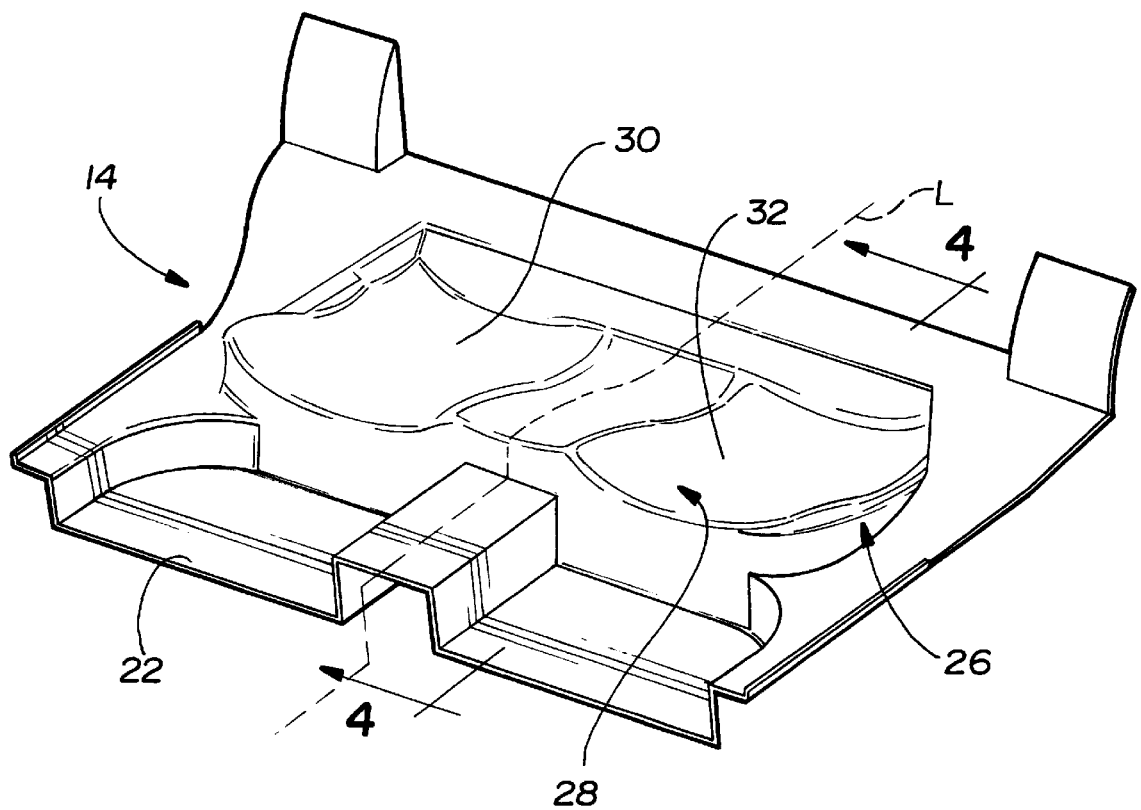
FIG. 3 is a perspective view of a portion of the floor pan of FIG. 2.
Figure 4:
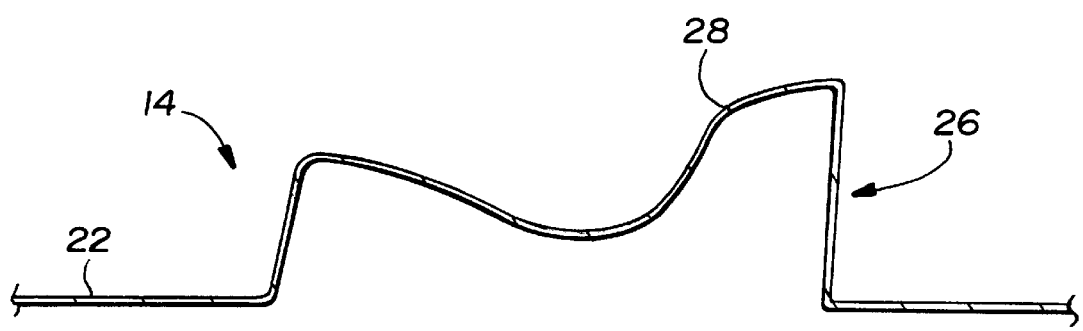
FIG. 4 is a partial cross-sectional view showing the contour of the floor pan along the line 4—4 of FIG. 3.

Turning first to the environmental view of FIG. 1, a seating arrangement constructed in accordance with the teachings of a preferred embodiment of the present invention is generally identified at reference numeral 10. The seating arrangement is shown operatively associated with an exemplary motor vehicle 12. However, it will become apparent to those skilled in the art that the subject invention has applicability to a wide range of vehicles.

With continued reference to FIG. 1 and additional reference to FIGS. 2–7, the seating arrangement 10 of the present invention is shown to generally include a floor pan 14, and a rear seat assembly 16. The rear seat assembly 16 includes a seat back portion 18 and a lower seat portion 20. In the embodiment illustrated the rear seat assembly 16 is configured for two passengers and is a substantial mirror image about a longitudinal vehicle center line L.

As most clearly shown in FIGS. 2–5, the floor pan 14 is contoured to cooperate with the lower seat portion 20. In this regard, the floor pan is shown to include a generally planar lower portion 22 to which the vehicle front seats 24 are secured in a substantially conventional manner. The floor pan 14 further includes a raised portion 26 which functions to elevate the rear seat assembly 16 to a desired height and further functions to directly support the lower seat cushion 20. The raised portion 26 includes an upper surface 28. The upper surface includes a first portion 30 and a second portion 32. In the embodiment illustrated, the first and second portions 30 and 32 are both concavely curved into lateral and longitudinal directions to accommodate the lower seat cushion 20.

Figure 5:
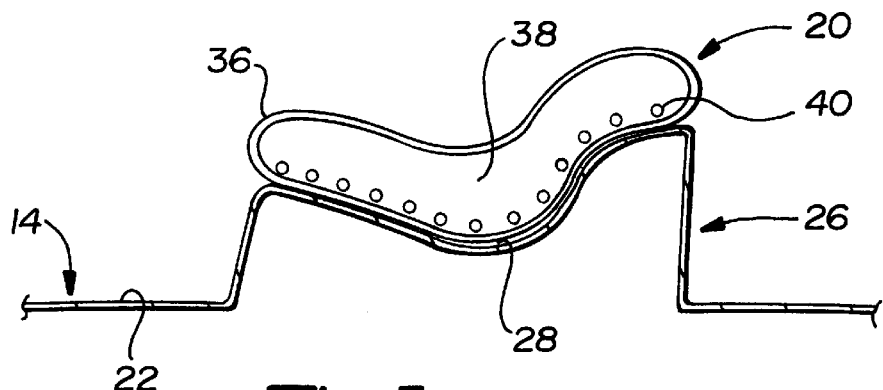
FIG. 5 is a partial cross-sectional view member to FIG. 4, illustrating a lower seat cushion operatively attached to the floor pan.
Figure 6:
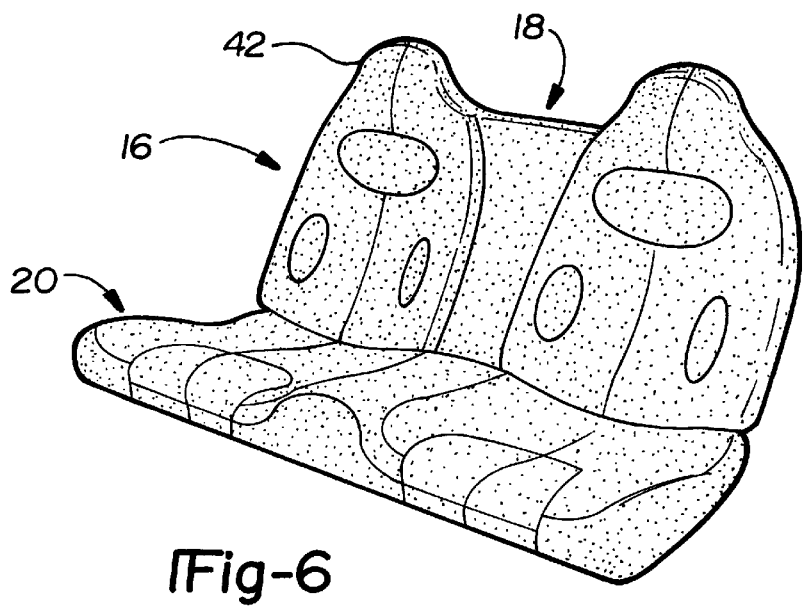
FIG. 6 is a perspective view of the lower seat cushion and seat back of FIG. 2.
Figure 7:
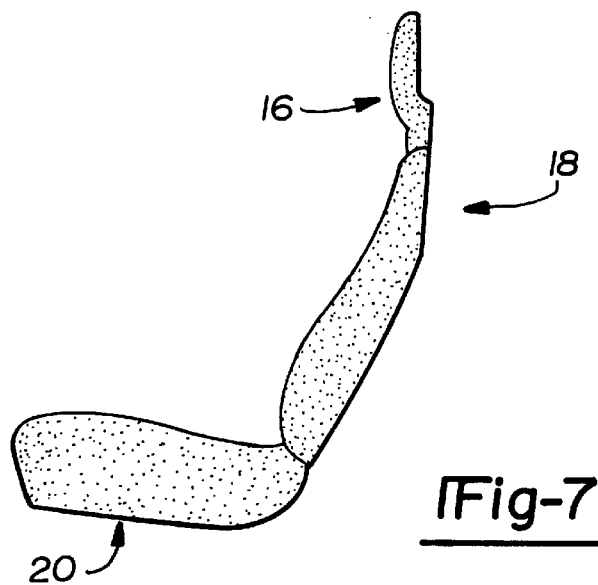
FIG. 7 is a side view of the lower seat back and seat.

As shown most clearly in FIG. 5, the lower seat member 20 includes an outer cover 36 constructed of leather, vinyl or other suitable material. The lower seat cushion additionally includes a foam cushion 38. In the exemplary embodiment illustrated, the lower seat cushion 20 further includes a plurality of wires 40 which function to maintain the shape of the lower seat cushion 20. The plurality of wires 40 are shown in FIG. 5 to extend in a lateral direction. However, it will be understood that the plurality of wires 40 may also extend in a longitudinal direction.

The lower seat portion 20 may be fixedly secured directly to the upper surface 28 of the raised portion 26 of the floor pan 14 with adhesive. Alternatively, in certain applications it may be desirable to allow the lower seat cushion 20 to be removed. In such an application, a hook and loop type fabric commonly referred to as Velcro® brand fastener may be used to secure the lower seat portion 20 to the upper surface 28 of the floor pan 14.

The seat back portion 18 is similarly formed to include an inner foam shell (not shown) and a cover 42. In the embodiment illustrated, the seat back portion 18 is supported by a seat back panel 44 which is conventionally mounted within the vehicle 12. Again, the seat back portion 18 may be adhesively or otherwise fixedly or removably secured to the seat back panel 44.

In one application, the floor pan 14 is unitarily constructed of a carbon fiber material. However, it will be understood that the floor pan 14 may be alternatively constructed from any of a number of suitable materials, including but not limited to steel.

While the above description constitutes the preferred embodiment of the invention, it will be appreciated that the invention is susceptible to modification, variation, and change without departing from the proper scope or fair meaning of the accompanying claims.

We claim:

1. A rear seating arrangement for a motor vehicle, the rear seating arrangement comprising:

a seat cushion assembly including a lower portion and a seat back portion; and a floor pan including a longitudinal centerline, a lower portion, and a raised portion, the raised portion directly supporting the lower portion of the seat cushion assembly, the raised portion including an upper surface having a first portion concavely curved in a longitudinal direction and a second portion concavely curved in the longitudinal direction, the first and second portions being substantial mirror images of one another about the longitudinal centerline, the raised portion including a forward vertical member and a rear vertical member, the rear vertical member downwardly extending from the upper surface;

the seat cushion assembly horizontally extending between the forward vertical member and rear vertical member; and a seat back panel upwardly extending from adjacent the rear vertical member, the seat back portion of the seat cushion assembly secured to the seat back panel.

2. The rear seating arrangement for a motor vehicle of claim 1, wherein the first and second portions of the upper surface are each concavely curved in a lateral direction.

3. The rear seating arrangement for a motor vehicle of claim 1, wherein the lower portion of the seat cushion assembly is permanently secured to the upper surface of the raised portion.

4. The rear seating arrangement for a motor vehicle of claim 1, wherein the lower portion of the seat cushion assembly is removably attached to the upper surface of the raised portion.

5. The rear seating arrangement of claim 1, wherein the floor pan is unitarily constructed of a carbon fiber material.

* * * * *